July 5, 1938.  W. A. WHIPPLE  2,123,127
INSECT ELECTROCUTING DEVICE
Filed Feb. 8, 1938
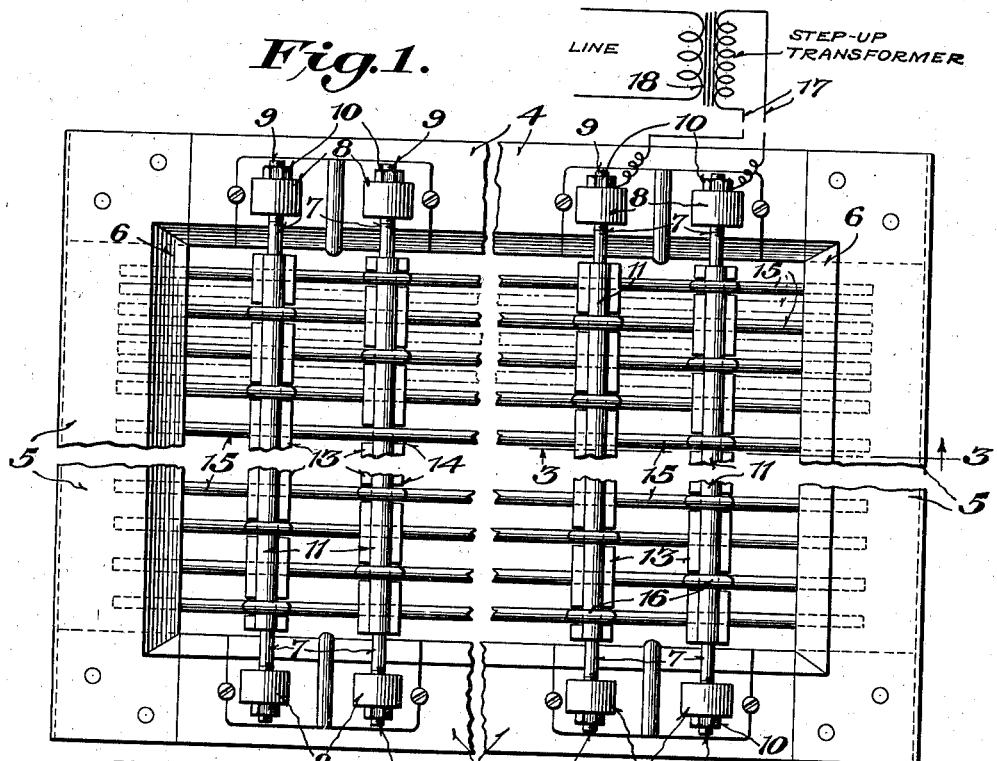
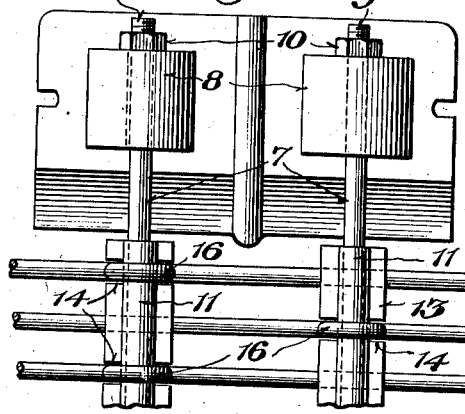
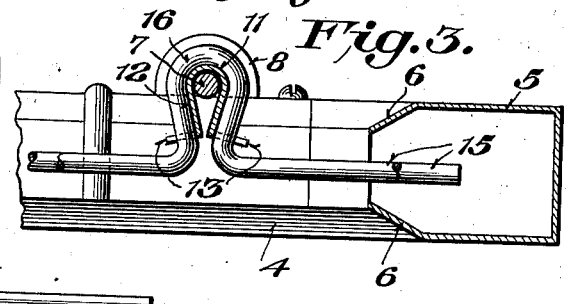
Inventor
Willis A. Whipple,
By Royal E. Burnham,
Attorney Patented July 5, 1938

2,123,127

UNITED STATES PATENT OFFICE 2,123,127

INSECT ELECTROCUTING DEVICE

Willis A. Whipple, Camp Lake, Wis., assignor to Robert Malcom, Chicago, Ill.

Application February 8, 1938, Serial No. 189,432

5 Claims. (Cl. 43—112)

This invention relates to devices of the insect electrocuting type.

It is concerned particularly with means for mounting a plurality of electrodes in substantially parallel relation on cross members constituting supports and conductors. Further, the invention relates also to means whereby the distance between adjacent electrodes may be adjusted in accordance with the size of the insects sought to be exterminated. In addition, it provides features that contribute to the integrity and efficiency of the structure.

When considered with the description herein, characteristics of the invention are apparent in the accompanying drawing, forming part thereof, wherein an embodiment of the invention is disclosed for purposes of illustration.

Like reference-characters refer to corresponding parts in the views of the drawing, of which—

Fig. 1 is a front view;

Fig. 2 is an enlarged fragmentary view;

Fig. 3 is a section on the line 3—3, Fig. 1.

The frame of the device preferably is rectangular. It is formed of opposite members 4, which advantageously may be made of wood, and opposite members 5, which may be of sheet or other comparatively thin metal. The members 5 are in the form of channel bars, in the ends of which the ends of the members 4 are disposed and secured. The free end portions of the channel walls, between the members 4, are deflected toward each other as guard-lips 6.

Metallic cross-rods 7 are disposed in two pairs substantially parallel to the frame members 5, each pair being relatively near one of those members. The end portions of the rods are longitudinally movable in, and are held in the structure by, insulators 8 of porcelain or other suitable material mounted at opposite places on the frame members 4. The ends of the rods are threaded, as shown at 9, and carry nuts 10 to prevent their disengagement from the insulators.

Each of the rods 7 is tightly embraced by an elongated sheet metal channel member 11. The webs 12 of this member are brought close together at their ends, and thence the material thereof flares laterally and outwardly as flanges 13. The flanges are formed with a plurality of equally-spaced notches or open-end seats 14, those of one flange being opposite those of the other flange.

A plurality of metallic electrodes 15, of strong bendable rod, wire, or other elongated conductive material, are mounted on the rods 7 at substantially right angles thereto and in substantially parallel relation to one another. Each of the electrodes is bent to afford two loops 16, one of which straddles and clamps the channel member 11 of one of a pair of rods 7, and the other of which similarly is associated with the member 11 of one of the other pair of rods 7. The legs of each loop 16 clamp into opposite notches or seats 14.

The clasping, clamping, and gripping action of the metallic members 11 on the rods 7 and of the metallic electrodes 15 on the members 11 and into the seats 14 thereof produces a permanent association of the parts.

Although the rods 7, as shown, are in a plane outside of that of the frame, the channel members 11 extend inwardly, so that the electrodes are disposed in substantially the mid plane of the frame.

The end portions of the electrodes extend into the channel frame members 5 and out of contact with the walls thereof. Those members thus constitute guards that shield the hands from contact with the electrodes and permit the frame to be handled without danger.

Each of one pair of rods 7 is connected by conductors 17 with any suitable source of electricity, as with a step-up transformer 18 as shown, the current flow of which may be controlled by a conventional switch (not shown).

Alternate electrodes are loop connected to one rod 7 of the pair at one side of the frame and to the corresponding rod 7 of the pair at the other side of the frame, and the other electrodes similarly are connected to the other rods 7. Thus one set of electrodes is connected with one side of the circuit and the other set with the other side, and two adjacent electrodes are in different sides of an open circuit. It is to be noted that the legs of the electrode loops 16 extend sufficiently beyond the channel members 11 to space the electrodes from the plane of those members. Therefore, the electrodes do not touch and short circuit with the rods to which they are not loop connected.

With this arrangement of electrodes, when a fly or other insect has spanning contact with two adjacent electrodes, the circuit is closed through it and electrocution results.

Ordinarily, the electrodes are equally spaced from one another. However, when closer spacing is desirable to enable smaller insects to contact with two adjacent electrodes, two rods 7 (one of each pair) carrying one set of electrodes may be adjusted longitudinally by turning the nuts 10 to bring those electrodes closer to those of the other set, as indicated by dotted lines in Fig. 1.

The device may be installed as a screen in a window or as a panel in a door, it may be hung in any desired place, it may be set on any suitable support, or it may be positioned in any other way desirable for contact of insects with its electrodes.

I claim:

1. An insect electrocuting device comprising a frame, insulators thereon, metallic supporting rods mounted and longitudinally movable in said insulators and disposed in substantially parallel pairs, the rods of one pair being connectible with a source of electric supply, metallic channel members embracing said rods formed with laterally-extending flanges having open-end oppositely-disposed seats, elongated electrodes disposed in substantially parallel relation to one another transversely of said rods having loops formed of the material thereof, the loops of alternate electrodes straddling the channel member of one of each of said pairs of rods and the loops of the other electrodes similarly being associated with the others of said pairs of rods, and means whereby said rods are adjusted longitudinally to vary the distance between adjacent electrodes.

2. An insect electrocuting device comprising supporting rods, channel members embracing said rods formed with open-end lateral oppositely-disposed seats, and elongated electrodes having loops straddling said members and disposed in said seats.

3. An insect electrocuting device comprising supporting rods, channel members embracing said rods formed with laterally-extending flanges having open-end oppositely-disposed seats, and elongated electrodes having loops straddling said members and disposed in said seats.

4. An insect electrocuting device comprising supporting rods, elongated metallic channel members embracing said rods formed with laterally-extending flanges having open-end oppositely-disposed seats, and metallic rod-like electrodes having loops formed of the material thereof straddling said members and clamping themselves in said seats.

5. An insect electrocuting device comprising a frame, insulators thereon, supporting rods mounted and longitudinally movable in said insulators and disposed in substantially parallel pairs, the rods of one pair being connectible with a source of electric supply, elongated electrodes disposed in substantially parallel relation to one another transversely of said rods, alternate electrodes being mounted on one of each of said pairs of rods and alternate electrodes being mounted on the others of said pairs of rods, and means whereby said rods are adjusted longitudinally to vary the distance between adjacent electrodes.

WILLIS A. WHIPPLE.